United States Patent
Kato et al.

(10) Patent No.: US 11,017,949 B2
(45) Date of Patent: May 25, 2021

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Yoichi Kato, Tokyo (JP); Kotaro Mizuno, Tokyo (JP); Yukihiro Konishi, Tokyo (JP); Yasunari Kato, Tokyo (JP); Yosuke Sato, Tokyo (JP); Hidenori Wakayanagi, Tokyo (JP); Joji Kobayashi, Tokyo (JP); Toshimitsu Kogure, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 249 days.

(21) Appl. No.: 15/167,267

(22) Filed: May 27, 2016

(65) Prior Publication Data

US 2016/0351335 A1 Dec. 1, 2016

(30) Foreign Application Priority Data

May 29, 2015 (JP) .............................. JP2015-109660
Mar. 17, 2016 (JP) .............................. JP2016-053325

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/12* (2013.01); *H01G 4/232* (2013.01); *H01G 4/005* (2013.01)

(58) Field of Classification Search
CPC ...... H01G 4/30; H01G 4/1227; H01G 4/0085; H01G 4/005; H01G 4/12; H01G 4/012;
(Continued)

(56) References Cited

U.S. PATENT DOCUMENTS

2008/0304204 A1* 12/2008 Suzuki .................. H01G 4/012
361/321.3
2009/0310276 A1* 12/2009 Tashima ................ H01G 4/012
361/303
(Continued)

FOREIGN PATENT DOCUMENTS

JP          55-65420 A    5/1980
JP          02-66916 A    3/1990
(Continued)

OTHER PUBLICATIONS

Office Action dated May 10, 2017 in Korean Application No. 10-2016-0064160.
(Continued)

*Primary Examiner* — Arun Remaswamy
(74) *Attorney, Agent, or Firm* — Saliwanchik, Lloyd & Eisenschenk

(57) ABSTRACT

A multi-layer ceramic capacitor according to an embodiment of the present invention includes a multi-layer, side margins and offset sections. The multi-layer includes internal electrodes and dielectric layers alternately laminated. The side margins are configured of a dielectric and disposed to cover side faces of the multi-layer. The offset sections are made with amorphous areas or gap areas. The offset sections are formed between the internal electrodes and the side margins such that ends at side faces of the internal electrodes are offset from the side faces to an inward direction of the multi-layer.

2 Claims, 9 Drawing Sheets

(51) Int. Cl.
*H01G 4/12* (2006.01)
*H01G 4/005* (2006.01)
*H01G 4/232* (2006.01)

(58) Field of Classification Search
CPC ...... H01G 4/248; H01L 28/55; B23K 26/362; B23K 26/02624
USPC .............. 361/321.1, 301.4, 321.2, 321.3, 320
See application file for complete search history.

(56) References Cited

U.S. PATENT DOCUMENTS

| | | |
|---|---|---|
| 2013/0100579 A1 | 4/2013 | Morito |
| 2013/0199717 A1 | 8/2013 | Tanaka et al. |
| 2013/0208399 A1* | 8/2013 | Morita ..................... H01G 4/12 361/301.4 |
| 2014/0301014 A1* | 10/2014 | Kim ......................... H01G 4/30 361/301.4 |
| 2014/0362492 A1 | 12/2014 | Lee et al. |

FOREIGN PATENT DOCUMENTS

| | | |
|---|---|---|
| JP | 2624849 B2 | 6/1997 |
| JP | 2005-259964 A | 9/2005 |
| JP | 2009-016796 A | 1/2009 |
| JP | 2009-032833 A | 2/2009 |
| JP | 2011-009369 A | 1/2011 |
| JP | 2012-227198 A | 11/2012 |
| JP | 2013162037 A | 8/2013 |
| JP | 2014143357 A | 8/2014 |
| JP | 2015-029158 A | 2/2015 |
| KR | 10-2014-0142848 A | 12/2014 |

OTHER PUBLICATIONS

Office Action dated Oct. 2, 2019 in Japanese Application No. 2018-101232.

* cited by examiner

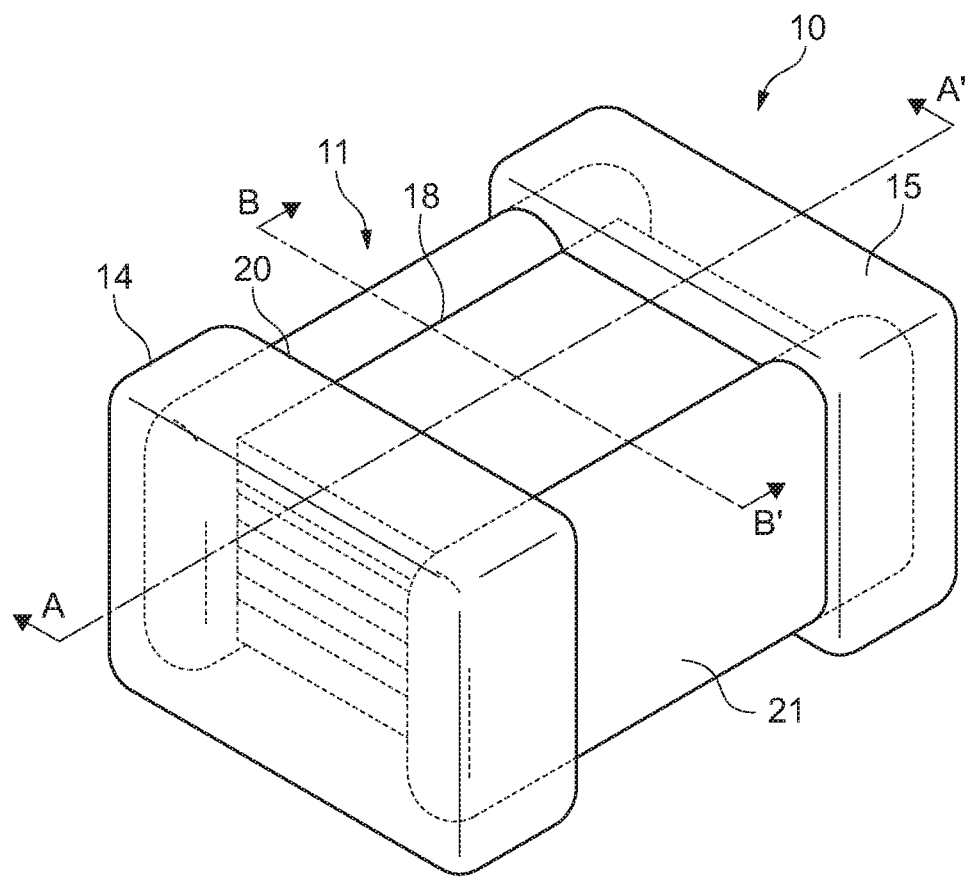
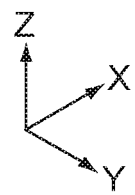
FIG.1

MULTI-LAYER CERAMIC CAPACITOR AND METHOD OF PRODUCING THE SAME

CROSS REFERENCE TO RELATED APPLICATIONS

This application claims priority under 35 U.S.C. § 119 to Japanese Patent Application Nos. 2015-109660, filed May 29, 2015; and 2016-053325, filed Mar. 17, 2016, which are hereby incorporated by reference in their entirety.

BACKGROUND

The present invention relates to a multi-layer ceramic capacitor that is applicable to miniaturization and capacity enlargement.

BRIEF SUMMARY

In recent years, along with miniaturization and capacity enlargement of electronic devices, the miniaturization and the capacity enlargement of multi-layer ceramic capacitors used in the electronic devices are increasingly demanding. In order to increase the capacity while suppressing the size of the multi-layer ceramic capacitors, it is effective to enlarge intersection areas of internal electrodes of the multi-layer ceramic capacitor (areas where the internal electrodes faced are overlapped) as great as possible.

According to a technology developed for enlarging the in areas of the internal electrodes, side faces of multi-layer chips are cut off to expose the internal electrodes to cut faces, and side margins for ensuring insulation properties around the internal electrodes are retrofitted thereafter. The technology allows the side margins to be formed thinly and the intersection areas of the internal electrodes to be relatively enlarged.

When the side faces of the multi-layer chips are cut off, the cut faces may be scratched or foreign matters such as cut pieces (sludge) may be adhered to the cut faces. If the cut faces are scratched or the foreign matters are attached to the cut faces in the state that the internal electrodes are exposed to the cut faces, the upper and lower internal electrodes in a lamination direction may conduct each other, resulting in a high probability of a short circuit.

It tries to overcome the problems by suppressing the scratches and the adhesion of the foreign matters on the cut faces. For example, Japanese Patent Application Laid-open No. 2013-162037 discloses a method of cutting a multi-layer along an extension direction of internal electrodes, whereby the short circuit between the internal electrodes is less likely to occur as compared with the case that the multi-layer is cut along a laminate direction. Japanese Patent Application Laid-open No. 2014-143357 discloses a method of preventing an adhesion sheet holding a multi-layer from cutting to suppress an occurrence of an adhesive waste by cutting the multi-layer from an upper face side in a lamination direction partway and cutting the rest from a lower face side.

However, even if the cutting is improved as described in Japanese Patent Application Laid-open Nos. 2013-162037 and 2014-143357, the elongation of the internal electrodes upon the cutting, the occurrence of the cut pieces and the like cannot be completely suppressed. If the space between the internal electrodes is narrowed along with the miniaturization of the multi-layer ceramic capacitor, a short circuit is likely to occur at ends of the internal electrodes exposed to the cut faces. In addition, after the cutting and before the formation of the side margins, it undesirably needs to prevent the scratches and the deposits on the cut faces.

In view of the circumstances as described above, an object of the present invention is to provide a multi-layer ceramic capacitor for suppressing an occurrence of a short circuit between internal electrodes and a method of producing the same.

In order to achieve the object, a multi-layer ceramic capacitor according to an embodiment of the present invention includes a multi-layer, side margins and offset sections.

The multi-layer includes internal electrodes and dielectric layers alternately laminated.

The side margins are configured of a dielectric and disposed to cover side faces of the multi-layer.

The offset sections are made with amorphous areas or gap areas. The offset sections are formed between the internal electrodes and the side margins such that ends at side faces of the internal electrodes are offset from the side faces to an inward direction of the multi-layer.

By the configuration, the ends of the internal electrodes at the side faces of the multi-layer are offset to the inward direction of the multi-layer. Thus, the ends of the internal electrodes are insulated by the dielectric layer. Accordingly, even if there are scratches and deposits on the side faces of the multi-layer before the formation of the side margins during a manufacturing process, it is possible to prevent the internal electrodes from conducting each other at the side faces. This allows the short circuit between the internal electrodes to be suppressed.

A width of each offset section may be 0.1 μm or more.

By setting the width of each offset section to 0.1 μm or more, it can decrease the probability that the internal electrodes conduct each other at the side faces of the multi-layer.

A method of producing a multi-layer ceramic capacitor according to an embodiment of the present invention includes forming a multi-layer where ceramic sheets configuring dielectric layers and electrical conductors configuring internal electrodes are alternately laminated.

Side faces of the multi-layer are cut so as to expose the electrical conductors.

The exposed electrical conductors at the side faces of the multi-layer are etched.

Side margins composed of ceramic are disposed so as to cover the side faces of the multi-layer after etching to form a capacitor body.

The capacitor body is sintered.

In the method where the multi-layer is cut to expose the electrical conductors at the side faces and the side margins are then retrofitted, the electrical conductors exposed at the side faces are elongated upon cutting, which results in a possible contact of the internal electrodes or possible scratches or the deposits on the side faces. In contrast, in the above-described method, etching is carried out before the side margins are formed on the multi-layer. In this manner, the electrical conductors configuring the internal electrodes exposed at the side faces can be removed, and the side faces of the internal electrodes can be offset to the inward direction of the multi-layer. Accordingly, the multi-layer ceramic capacitor having enlarged intersection areas of the internal electrodes can be produced with no influence of elongation of the internal electrodes at the side faces of the multi-layer and of the scratches or deposits on the side faces that may be generated during a manufacturing process.

In the present specification, as to the description about the production method, an unsintered multi-layer and the sintered multi-layer are collectively referred to as the "multi-layer", unless otherwise noted. Accordingly, the unsintered multi-layer may be etched or the sintered multi-layer may be etched. When the sintered multi-layer is etched, the side margins are formed on the sintered multi-layer to provide the capacitor body, and sintering may be then carried out again.

The etching may be carried out with acid or by ion bombardment or by laser irradiation.

In this way, ends of the electrical conductors exposed from the side faces can be removed, and the electrical conductors can be offset to the inward direction of the multi-layer.

For example, the etching may be carried out with nitric acid.

This allows the electrical conductors including metal to be dissolved. The side faces of the multi-layer can be selectively etched.

The etching may be carried out with concentrated nitric acid.

By using concentrated nitric acid, the internal electrodes can be more uniformly etched.

In the etching, laser may be irradiated under the condition that the electrical conductors are selectively removed.

In this manner, the electrical conductors can be etched appropriately and preferentially than the ceramic sheets.

As the laser satisfying the condition, green laser or UV (ultraviolet) laser can be used.

In addition, in the etching, the laser irradiation may be carried out using nanosecond pulse laser, picosecond pulse laser or femtosecond pulse laser.

By using the laser, the electrical conductors can be appropriately removed.

Specifically, in the etching, green laser having a wavelength band of 532 nm, UV (ultraviolet) laser having a wavelength band of 355 nm or infrared ray laser having a wavelength band of 1064 nm may be used.

In this manner, the electrical conductors can be etched appropriately and preferentially than the ceramic sheets.

There can be provided a multi-layer ceramic capacitor for suppressing an occurrence of a short circuit between internal electrodes and a method of producing the same.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 1 is a perspective view of a multi-layer ceramic capacitor according to an embodiment of the present invention;

DETAILED DESCRIPTION

Figure 2:
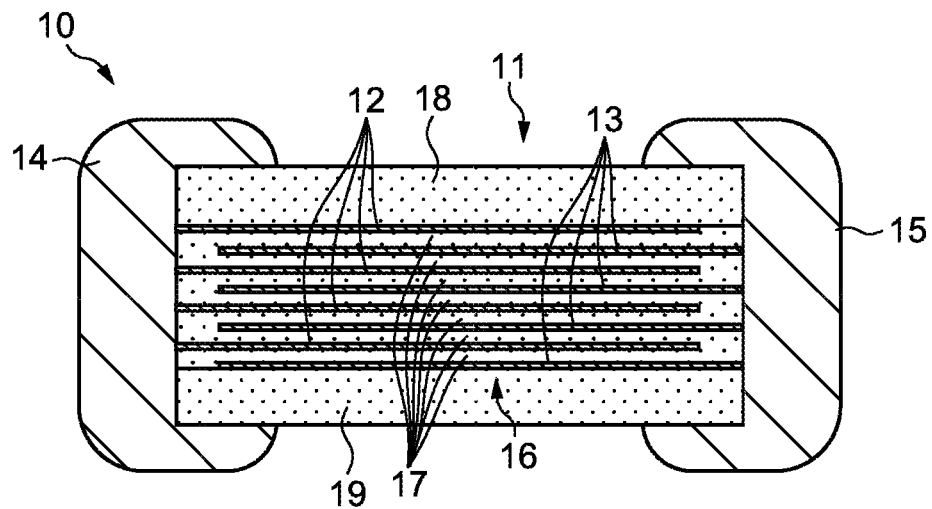
FIG. 2 is a cross-sectional view along an A-A' line of the multi-layer ceramic capacitor.

Hereinafter, an embodiment of the present invention will be described with reference to the drawings.

In the drawings, there are shown an X axis, a Y axis and a Z axis that are mutually perpendicular as appropriate. The X axis, the Y axis and the Z axis are common in all drawings.

[Structure of Multi-layer Ceramic Capacitor 10]

Figure 3:
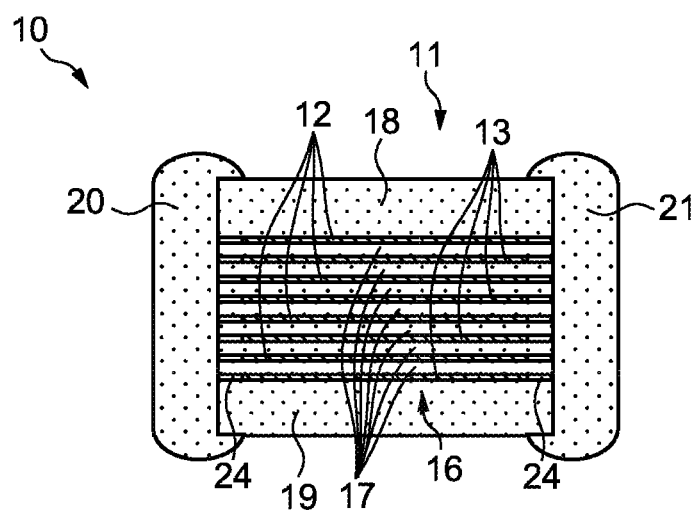
FIG. 3 is a cross-sectional view along a B-B' line of the multi-layer ceramic capacitor.

FIGS. 1 to 3 each shows a multi-layer ceramic capacitor 10 according to an embodiment of the present invention.

FIG. 1 is a perspective view of the multi-layer ceramic capacitor 10. FIG. 2 is a cross-sectional view along an A-A' line of the multi-layer ceramic capacitor 10. FIG. 3 is a cross-sectional view along a B-B' line of the multi-layer ceramic capacitor 10.

The multi-layer ceramic capacitor 10 includes a body 11, a first external electrode 14, and a second external electrode 15. The body 11 includes a plurality of first internal electrodes 12 and a plurality of second internal electrodes 13. The external electrodes 14, 15 cover both end faces of the body 11 in an X axis direction. The first external electrode 14 is connected to the first internal electrodes 12, and the second external electrode 15 is connected to the second internal electrodes 13.

The body 11 includes a multi-layer 16, a first cover layer 18, a second cover layer 19, a first side margin 20, a second side margin 21, and offset sections 24.

The multi-layer 16 is configured of a dielectric, and includes a plurality of the first internal electrodes 12, and a plurality of the second internal electrodes 13 inside. The first internal electrodes 12 and the second internal electrodes 13 are flat plates extending along an XY plane, and are laminated alternately in a Z axis direction. In this manner, dielectric layers 17 are formed between the first internal electrodes 12 and the second internal electrodes 13. That is to say, the multi-layer 16 is formed by laminating alternately the internal electrodes 12, 13 and the dielectric layers 17.

In the multi-layer 16, a thickness of the dielectric is no especially limited, and is within a range of 0.5 μm to 2.0 μm, for example. A thickness of the internal electrodes is not especially limited, and is within a range of 0.5 μm to 2.0 μm, for example. As an example, the thickness of the dielectric layers and the thickness of the internal electrodes may be about 1.0 μm, respectively. The lamination number of the dielectric layers and the internal electrodes may be set arbitrary, and may be several tens, several hundreds, or as much as 1000 or more. As an example, 300 dielectric layers and 300 internal electrodes may be used, which are not limited thereto.

The internal electrodes 12, 13 are configured of electrically conductive materials, and function as internal electrodes of the multi-layer ceramic capacitor 10 configured as flat plates. Examples of the electrically conductive materials include a metal material including nickel (Ni), copper (Cu), palladium (Pd), platinum (Pt), silver (Ag), gold (Au) or an alloy thereof.

As the dielectric configuring the dielectric layers 17, a ceramic material is used. As the ceramic material, for example, a Perovskite structure material including barium (Ba) and titanium (Ti) exemplified by barium titanate (Ba- TiO₃) may be used. The ceramic material configuring the dielectric layers 17 may be strontium titanate (SrTiO₃), calcium titanate (CaTiO₃), magnesium titanate (MgTiO₃), calcium zirconate (CaZrO₃), calcium zirconate titanate (PCZT), barium zirconate (BaZrO₃), titanium oxide TiO₂) other than the barium titanate.

The cover layers 18, 19 are flat plates extending along an X-Y plane. The first cover layer 18 covers an upper face of the multi-layer 16 in the Z axis direction, and the second cover layer 19 covers a lower face of the multi-layer 16 in the Z axis direction.

The side margins 20, 21 are flat plates extending along an X-Z plane. The first side margin 20 covers a side face of the multi-layer 16 facing to a Y axis direction, and the second side margin 21 covers a side face of the multi-layer 16 opposite to the first side margin 20.

The cover layers 18, 19 and the side margins 20, 21 have functions to mainly protect the multi-layer 16 and to ensure insulation properties around the multi-layer 16.

The cover layers 18, 19 and the side margins 20, 21 are also formed of dielectric ceramic. A material for forming the cover layers 18, 19 and the side margins 20, 21 may be any material having insulation properties. By using the same material as the dielectric layers 17, an internal stress in the body 11 is suppressed.

Figure 4:
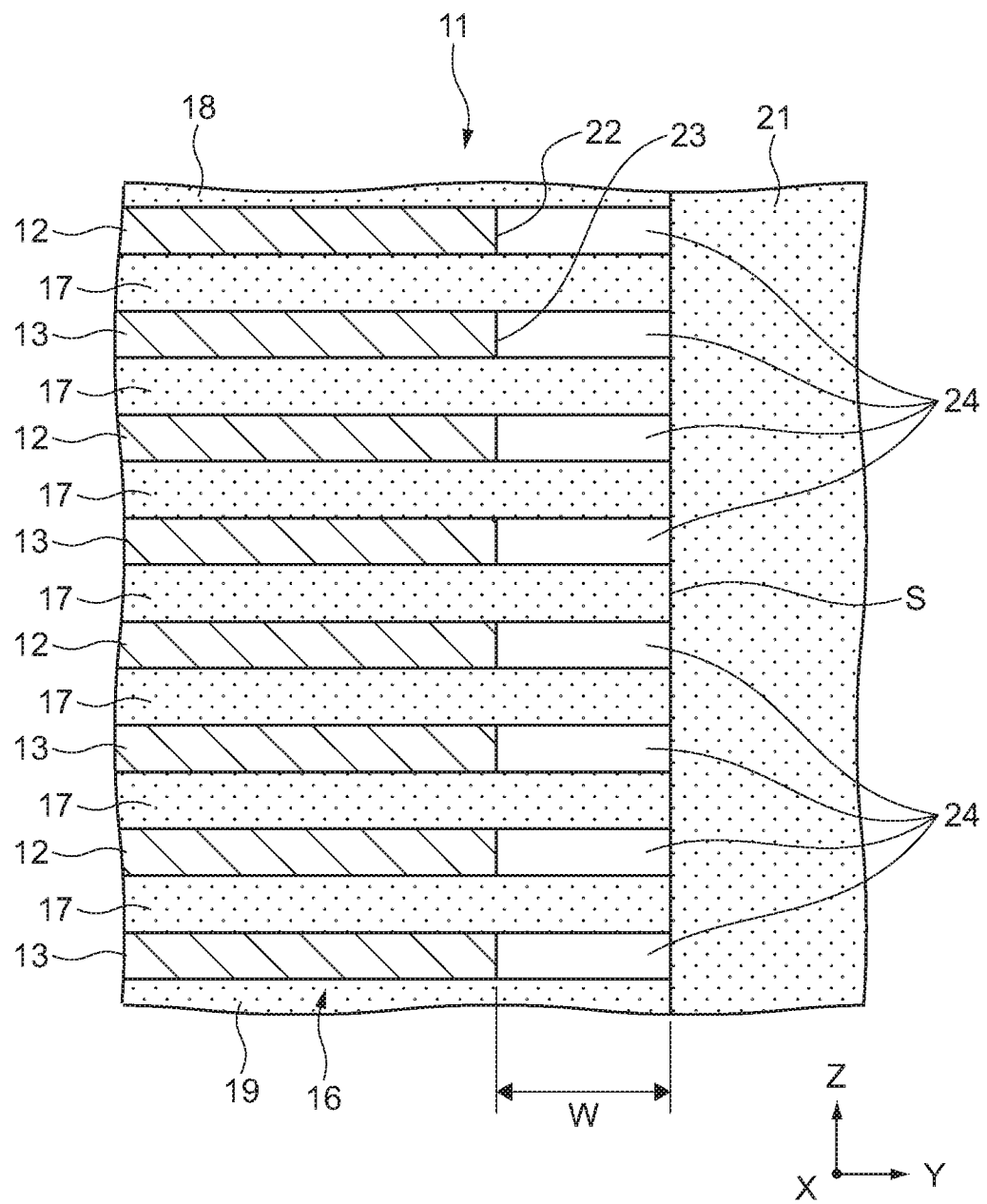
FIG. 4 is an enlarged view showing a part of the cross-sectional view in FIG. 3.

FIG. 4 is an enlarged view showing a part of the cross-sectional view in FIG. 3. As shown in FIG. 3 and FIG. 4, the offset sections 24 are formed between the internal electrodes 12, 13 and the first side margin 20 and between the internal electrodes 12, 13 and the second side margin 21. FIG. 4 shows the offset sections 24 formed between the internal electrodes 12, 13 and the second side margin 21. If the side face covered by the second side margin 21 of the multi-layer 16 is regarded as a side face S, the internal electrodes 12, 13 have ends 22, 23 on the side face S of the multi-layer 16.

Although not shown and no description, also on the side face at a first side margin 20 side of the multi-layer 16, the configurations of the internal electrodes 12, 13 and the offset sections 24 are substantially same as those on the side face at a second side margin 21 side.

The offset sections 24 are gaps disposed such that the ends 22, 23 of the internal electrodes 12, 13 are offset from the side face S of the multi-layer 16 to an inward direction of the multi-layer 16. The offset sections 24 may be gap areas (air gaps). Alternatively, the offset sections 24 may be amorphous areas. The amorphous areas are constituted of a material having no crystal structure, e.g., of a vitreous material. Examples of the vitreous material include a silicon oxide including a metal element such as Ba, Ni, manganese (Mn).

An offset width W of each offset section 24 is not especially limited, but is preferably 0.1 μm or more. In the present embodiment, the offset width W refers to a distance from the side faces S of the multi-layer 16 to ends 22, 23 of the internal electrodes 12, 13.

By the above-described configuration, in the multi-layer ceramic capacitor 10, if a voltage is applied across the first external electrode 14 and the second external electrode 15, the voltage is applied to a plurality of the dielectric layers 17 between the first internal electrodes 12 and the second internal electrodes 13. In this manner, in the multi-layer ceramic capacitor 10, an electric charge corresponding to the voltage across the first external electrode 14 and the second external electrode 15 is stored in a plurality of the dielectric layers 17.

[Method of Producing Multi-layer Ceramic Capacitor 10]

Figure 5:
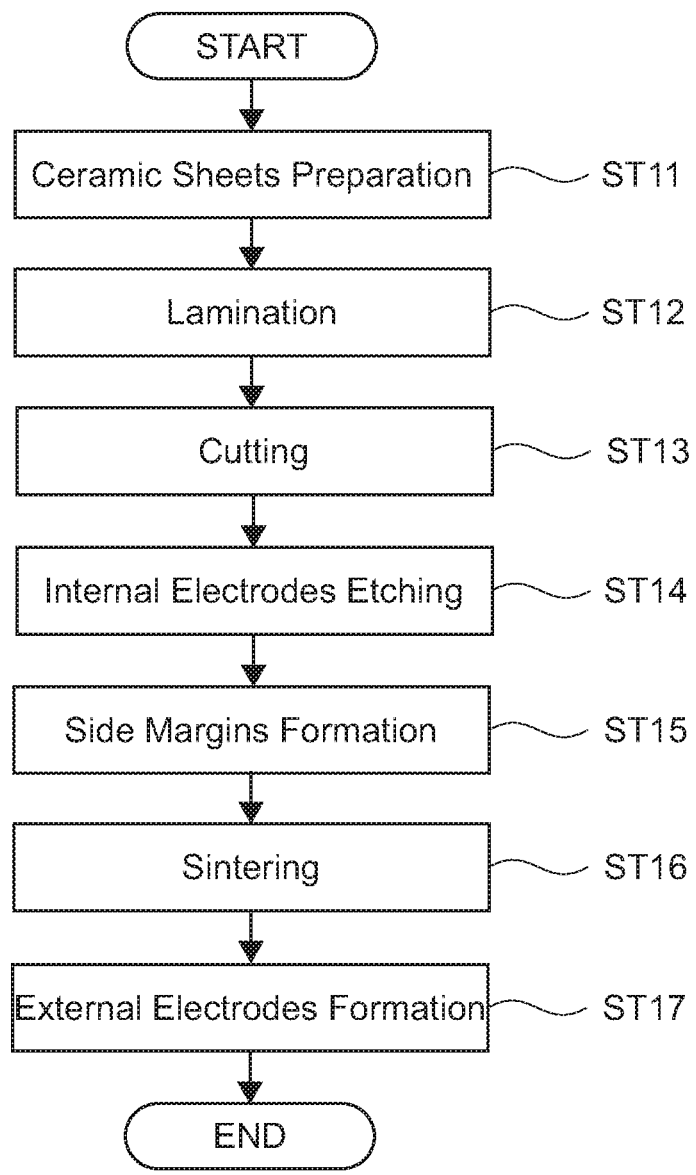
FIG. 5 is a flow chart showing a method of producing the multi-layer ceramic capacitor.

FIG. 5 is a flow chart showing a method of producing the multi-layer ceramic capacitor 10. FIGS. 6 to 10 each is a view showing a process of producing the multi-layer ceramic capacitor 10. Hereinafter, the method of producing the multi-layer ceramic capacitor 10 will be described using FIG. 5 referring to FIGS. 6 to 10 as appropriate.

(Step ST11: Ceramic Sheets Preparation Step)

In Step ST11, first ceramic sheets 101 and second ceramic sheets 102 for forming the dielectric layers 17 of the multi-layer 16, and third ceramic sheets 103 for forming the cover layers 18, 19 are prepared. The ceramic sheets 101, 102 and 103 are configured as unsintered dielectric green sheets, and are molded in sheets using a roll coater or a doctor blade, for example.

Figure 6:
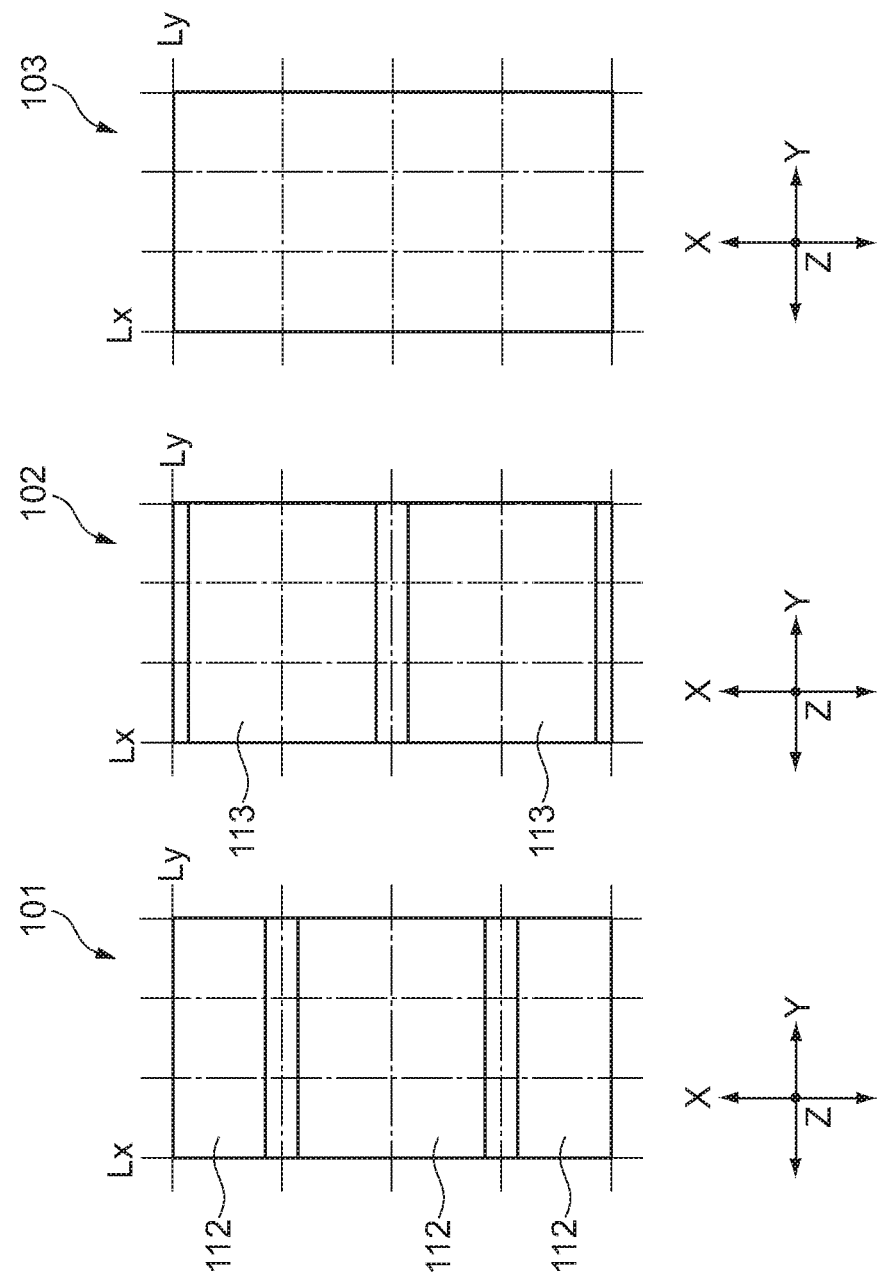
FIG. 6A is a plan view showing a process of producing the multi-layer ceramic capacitor.
FIG. 6B is a plan view showing a process of producing the multi-layer ceramic capacitor.
FIG. 6C is a plan view showing a process of producing the multi-layer ceramic capacitor.

FIG. 6 is a plan view of the ceramic sheets 101, 102, and 103. At this stage, the ceramic sheets 101, 102 and 103 are not cut for each multi-layer ceramic capacitor 10. In FIG. 6, cut lines Lx, Ly for cutting for each multi-layer ceramic capacitor 10 are shown. The cut line Lx is in parallel with the X axis, and the cut line Ly is in parallel with the Y axis.

As shown in FIG. 6, in the first ceramic sheet 101, unsintered first internal electrodes 112 corresponding to the first internal electrodes 12 are formed, and in the second ceramic sheet 102, unsintered second internal electrodes 113 corresponding to the second internal electrodes 13 are formed. In the third ceramic sheet 103 corresponding to the cover layers 18, 19, no internal electrode is formed.

The unsintered internal electrodes 112, 113 correspond to electrical conductors configuring the internal electrodes according to the present invention. The internal electrodes 112, 113 may be formed using any electrically conductive paste. For the formation of the internal electrodes 112, 113 by the electrically conductive paste, a screen printing method may be used, for example.

The internal al electrodes 112, 113 are disposed across two areas adjacent in the X axis direction partitioned by the cut line Ly, and extend vertically in the Y axis direction. The first internal electrodes 112 are shifted from the second internal electrodes 113 by one column partitioned by the cut line Ly. That is to say, the cut line Ly passing a center between the first internal electrodes 112 passes through between the second internal electrodes 113, and the cut line Ly passing a center between the second internal electrodes 113 passes through between the first internal electrodes 112.

The electrically conductive paste typically contains a metal material, an organic binder, and a solvent. These materials are not especially limited. If etching is carried out with acid in an internal electrode etching step (ST14) as described later, the organic binder included in the electrically conductive paste is preferably easily dissolved in the acid as compared with the organic binder included in the ceramic sheets 101, 102, and 103. As the organic binder, ethyl cellulose (EC) is usable.

(Step ST12: Lamination Step)

In Step ST12, the ceramic sheets 101, 102, and 103 prepared in Step ST11 are laminated to form an unsintered multi-layer 104.

Figure 7:
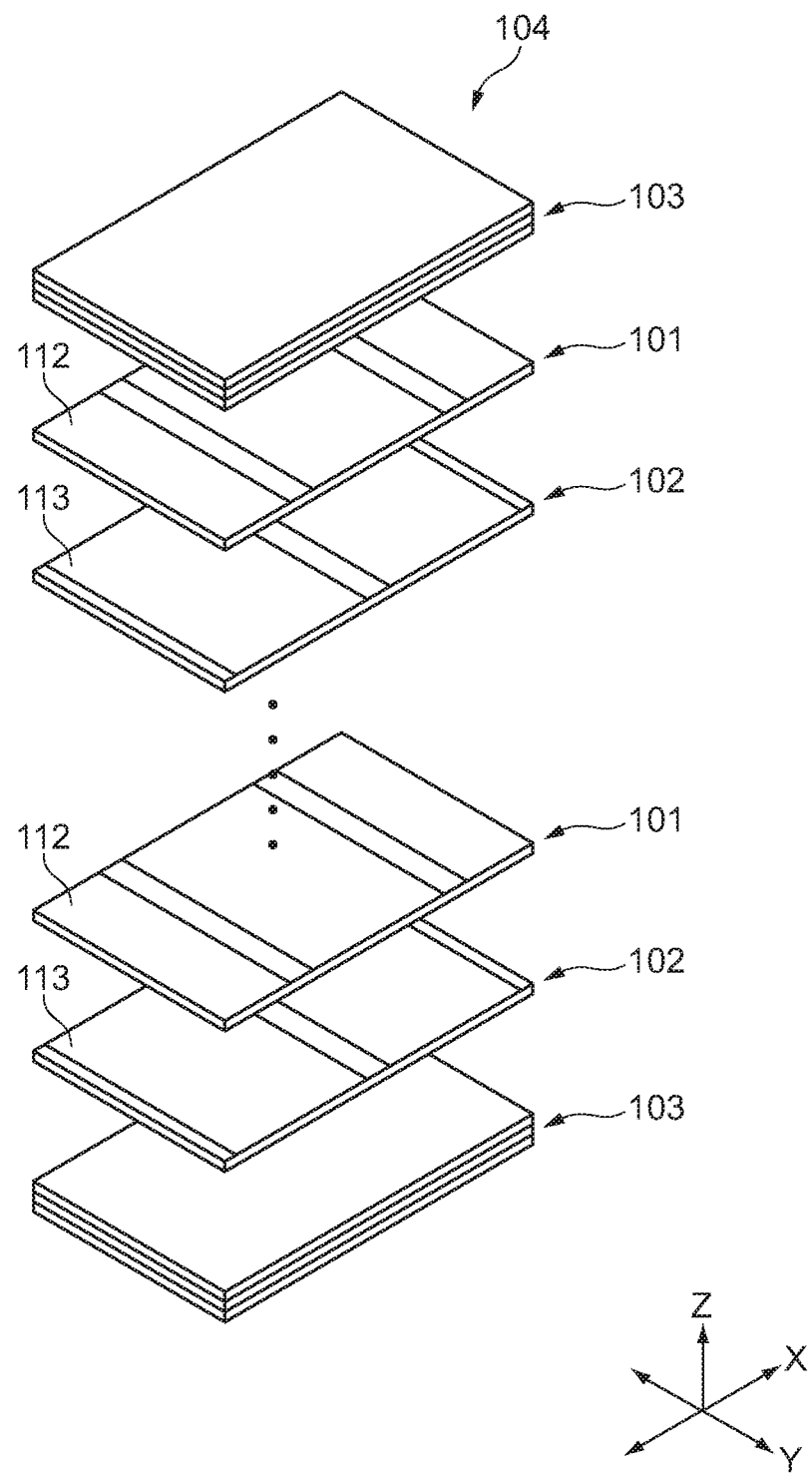
FIG. 7 is a perspective view showing a process of producing the multi-layer ceramic capacitor.

FIG. 7 is a perspective view showing the multi-layer 104 provided in Step ST12. In FIG. 7, the ceramic sheets 101, 102, and 103 are shown in an exploded way for the purpose of illustration. However, in the actual multi-layer 104, the ceramic sheets 101, 102, and 103 are integrated by thermal compression bonding.

In the multi-layer 104, the first ceramic sheets 101 and the second ceramic sheets 102 that correspond to the dielectric layers 17 of the multi-layer 16 are alternately laminated in the Z axis direction. In this manner, in the unsintered multi-layer 104, the ceramic sheets configuring the dielectric layers 17 and the electrical conductors configuring the internal electrodes 12, 13 are alternately laminated In the multi-layer 104, the third ceramic sheets 103 corresponding to the cover layers 18, 19 are laminated on upper and lower faces of the ceramic sheets 101, 102 alternately laminated in the Z axis direction. In the embodiment shown in FIG. 7, three third ceramic sheets 103 are laminated at each face. However, the number of the third ceramic sheets 103 may be changed as appropriate.

(Step ST13: Cutting Step)

In Step ST13, the multi-layer 104 provided in Step ST12 is cut to form multi-layer chips 105.

Figure 8:
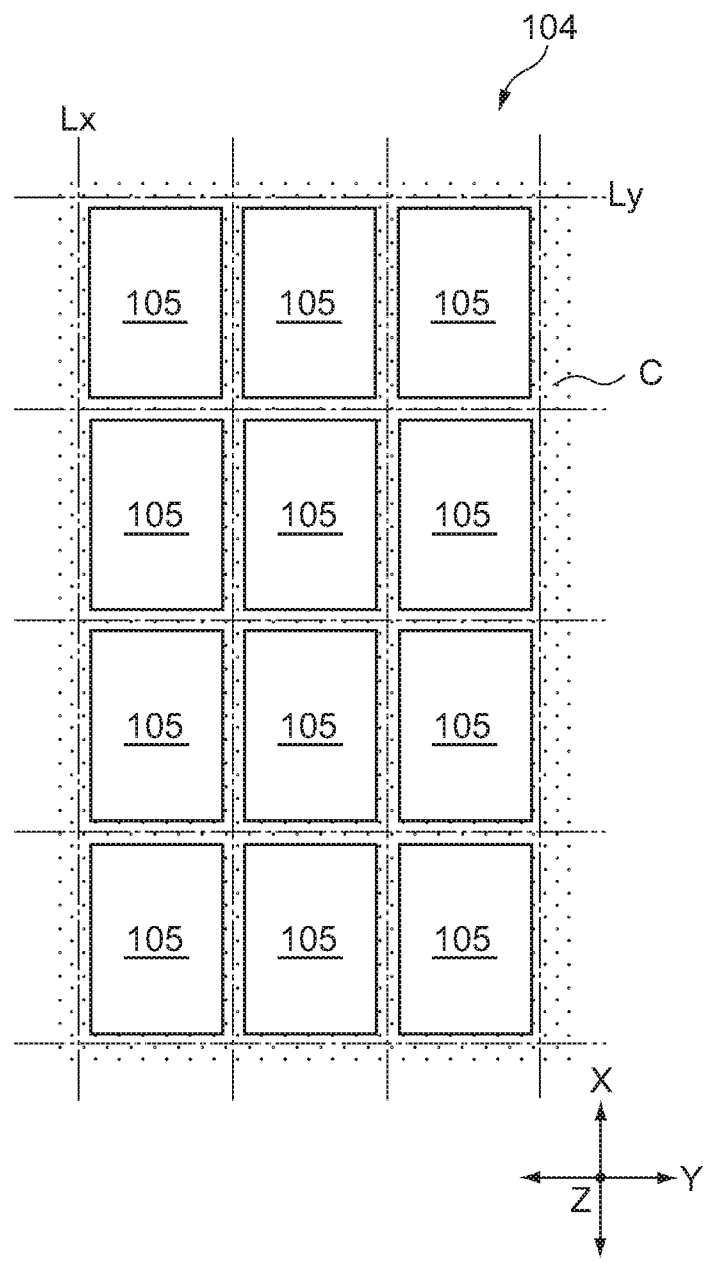
FIG. 8 is a plan view showing a process of producing the multi-layer ceramic capacitor.

FIG. 8 is a plan view showing the multi-layer 104 after Step ST13. The multi-layer 104 is cut along the cut lines Lx, Ly in a state that the multi-layer 104 is adhered to a cut tape C such as a foam tape. In this manner, the multi-layer 104 is divided into pieces, thereby providing the multi-layer chips 105.

Figure 9:
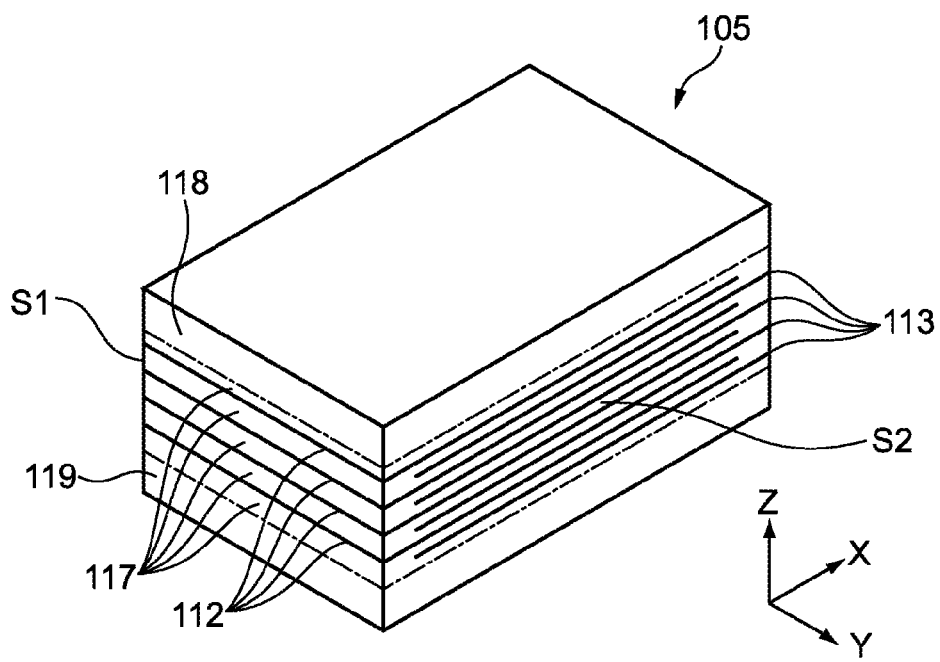
FIG. 9 is a perspective view showing a process of producing the multi-layer ceramic capacitor.

FIG. 9 is a perspective view showing the multi-layer chips 105 provided in Step ST13. In the multi-layer chips 105, the unsintered internal electrodes 112, 113, the unsintered dielectric layers 117, first cover layers 118, and second cover layers 119 are formed. In each multi-layer chip 105, the unsintered internal electrodes 112, 113 are exposed at both side faces S1, S2 that are cut sections facing to the Y axis direction.

The cut step in Step ST13 as described above corresponds to a step of cutting the side faces of the multi-layer such that the electrical conductors are exposed.

(Step ST14: Internal Electrodes Etching Step)

In Step ST14, the side faces S1, S2 that are the above-described cut faces facing to the Y axis direction of the unsintered internal electrodes 112, 113 exposed at the side faces of each multi-layer chip 105 provided in Step ST13 are etched.

For example, the etching may be carried out by immersing the side faces S1, S2 where the unsintered internal electrodes 112, 113 are exposed with acid for a predetermined time. By the etching, an offset width W of each offset section 24 (see FIG. 4) may be controlled by an immersion time. Thus, a desirable offset width W can be easily provided.

The acid used for etching may be such that the electrical conductors configuring the internal electrodes 112, 113 are dissolved. As the acid, nitric acid, more preferably, concentrated nitric acid, are usable. This allows the electrical conductors including metal to be dissolved. From the side faces S1, S2 of each multi-layer chip 105, the internal electrodes 112, 113 and metal deposits derived from the internal electrodes 112, 113 can be selectively etched. By using concentrated nitric acid, the internal electrodes 112, 113 can be more uniformly etched. The concentrated nitric acid refers to a nitric acid solution having a mass percent concentration of 60% or more.

Preferably, only the side faces (S1, S2) facing to the Y axis direction as described above are immersed so as not to etch each end face of each multi-layer chip 105 facing to the X axis direction, i.e., each end of the first internal electrode 112 at a first external electrode 14 side and each end of the second internal electrode 113 at a second external electrode 15 side. Alternatively, each end face of each multi-layer chip 105 facing to the X axis direction may be masked, and the multi-layer chips 105 may be immersed.

The etching in Step ST14 is not limited to the immersion with acid as described above. As a method other than the above, ion bombardment to the internal electrodes 112, 113 may be usable, for example.

Alternatively, the etching in Step ST14 may be laser irradiation. As the laser, YAG laser may be used, for example. By laser-irradiating the side faces S1, S2 using a laser irradiating apparatus, the ends exposed from the side faces S1, S2 of the internal electrodes 112, 113 can be removed. In this manner, an offset width W can be controlled finely, as described later.

In this case, the laser irradiation can be carried out under the condition that the internal electrodes 112, 113 can be selectively removed. As the laser satisfying the condition, green laser having a wavelength band of 532 nm (second harmonic), UV (ultraviolet) laser having a wavelength band of 355 nm (third harmonic) or infrared ray laser having a wavelength band of 1064 nm (fundamental harmonic) may be used. For example, if the internal electrodes 112, 113 include Ni, the green laser is especially preferably used. By using the laser, the internal electrodes 112, 113 can be appropriately etched. The internal electrodes 112, 113 can be etched preferentially than the ceramic sheets 101, 102. In this Step, semiconductor laser, fiber laser or the like can be used other than the YAG laser.

Also, in this Step, the laser irradiation can be carried out using nanosecond pulse laser, picosecond pulse laser or femtosecond pulse laser. That is to say, as the laser irradiation apparatus, a nanosecond laser apparatus where a pulse width is in a nanosecond region, a picosecond laser apparatus a pulse width is in a picosecond region or a femtosecond laser apparatus a pulse width is in a femtosecond region. Thus, by using the pulse laser apparatus having the short pulse width, the electrical conductors 112, 113 can be appropriately removed.

(Step ST15: Side Margins Formation Step)

In Step ST15, unsintered first side margin 120 and second side margin 121 are provided at side faces of each unsintered multi-layer chip 105 after etching provided in Step ST14, thereby forming an unsintered body 111. The side margins 120, 121 may be formed by immersing each side faces S1, S2 of each multi-layer chip 105 after etching with a paste material including a ceramic material similar to the dielectric layers 117 and the cover layers 118, 119, and pulling it up (dip method). In this manner, the side faces S1, S2 of each multi-layer chip 105 facing to the Y axis direction are covered by the side margins 120, 121 to ensure insulation properties around the internal electrodes 112, 113.

The method of forming the side margins 120, 121 in Step ST15 is not limited to the above-described dip method. Other methods may be used. For example, the side margins 120, 121 may be formed by applying ceramic slurry to the side faces of each multi-layer chip 105 after etching.

Figure 10:
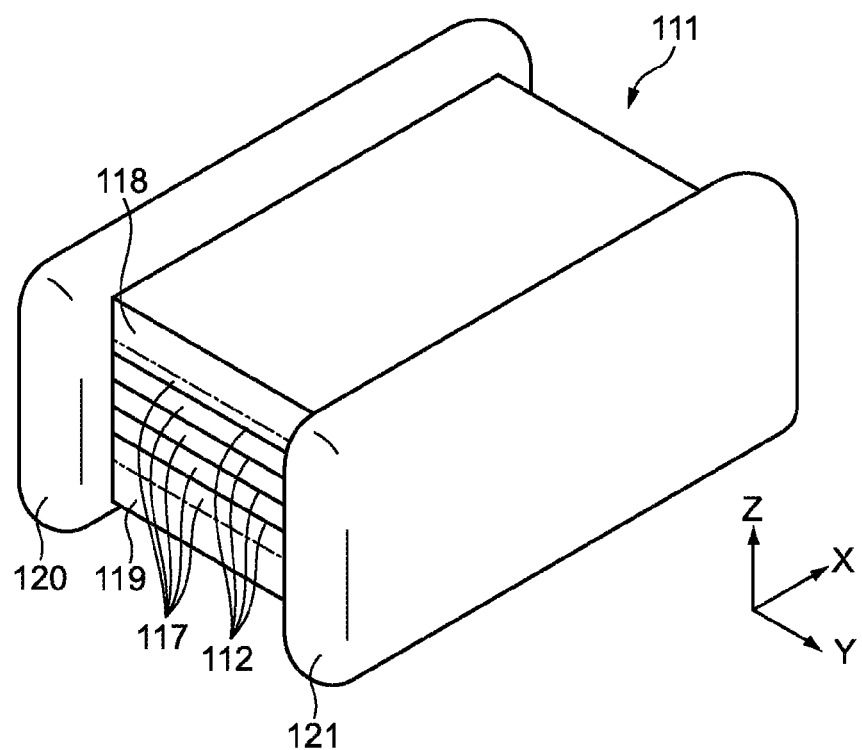
FIG. 10 is a perspective view showing a process of producing the multi-layer ceramic capacitor.

FIG. 10 is a perspective view of the unsintered body 111 provided in Step ST15. By carrying out Step ST15 after Step ST14, gaps that become the offset sections 24 are formed between the internal electrodes 112, 113 and the first side margin 120 and between the internal electrodes 112, 113 and the second side margin 121 in the unsintered body 111.

(Step ST16: Sintering Step)

In Step ST16, the unsintered body 111 provided in Step ST15 is sintered to form the body 11 of the multi-layer ceramic capacitor 10 shown in FIGS. 1 to 4. Sintering may be carried out under a reduction atmosphere or under a low oxygen partial pressure atmosphere, for example.

Depending on the atmosphere of sintering, liquid phase glass including a Si component included in the dielectric layers 17 and the side margin 21 may flow into the gap formed by etching. At this time, metal elements such as Ba, Ni and Mn included in the side margin 21 and the internal electrodes 112, 113 may diffuse into the vitreous material. In this manner, the offset sections 24 made with amorphous areas are formed.

If no amorphous areas are formed at the gap, the offset sections 24 made with the gap areas are formed.

(Step ST17: External Electrodes Formation Step)

In Step ST17, the external electrodes 14, 15 are formed on the body 11 provided in Step ST16, thereby producing the multi-layer ceramic capacitor 10 shown in FIGS. 1 to 3.

In Step ST17, an unsintered electrode material is applied to cover one end face of the body 11 in the X axis direction, and the unsintered electrode material is then applied to cover the other end face of the body 11 in the X axis direction. The unsintered electrode material applied is baked under a reduction atmosphere or under a low oxygen partial pressure atmosphere, for example, thereby forming a base film on the body 11. On the base film baked to the body 11, an intermediate film and a surface film are formed by plating such as electroplating, thereby forming the external electrodes 14, 15.

According to the method of producing the multi-layer ceramic capacitor 10 of the present embodiment, the side margins 120, 121 are retrofitted, thereby ensuring wide internal electrodes 12, 13 and enlarging intersection areas between the internal electrodes 12, 13.

Here, in the production method where the side margins are retrofitted after the unsintered multi-layer is cut and the electrical conductors are exposed at the side faces, the electrical conductors exposed at the side faces are elongated upon cutting, the internal electrodes are in contact each other, or scratches and deposits may be generated on the side faces. It is conceivable that a short circuit may easily occur between the ends of the internal electrodes at a boundary between the cut sections and the side margins.

Furthermore, structural defects such as the scratches and the deposits may cause a decrease in a product life or a withstand voltage of the multi-layer ceramic capacitor.

In contrast, according to the method of producing the multi-layer ceramic capacitor 10 of the present embodiment, the ends of the internal electrodes 112, 113 are etched from the side faces S1, S2 of the multi-layer chips 105 before the side margins 120, 121 are provided, as described above. In this manner, the electrical conductors configuring the internal electrodes 112, 113 exposed at the side faces S1, S2 can be removed, whereby the ends of the internal electrodes 112, 113 are offset to an inward direction of the multi-layer chips 105.

If there are the deposits derived from the internal electrodes 112, 113 accompanied by cutting the side faces S1, S2, the deposits may be removed by etching.

This ensures insulation properties between the internal electrodes 112, 113 adjacent. According to the present embodiment, a short circuit between the internal electrodes and a decrease in a product life or a withstand voltage of the multi-layer ceramic capacitor 10 can be prevented with no influence of elongation of the internal electrodes at the side faces of the multi-layer and the scratches or deposits on the side faces that may be generated during a manufacturing process.

In particular, when the offset width W is 0.1 μm or more, the ends 22, 23 of the internal electrodes 12, 13 are sufficiently receded from the side face S of the multi-layer 16. Therefore, the internal electodes 12, 13 are less affected from the deposits of foreign matters on the end faces at the side faces S of the multi-layer 16. That is to say, it can reduce a possibility that the internal electrodes 12, 13 are conducted at the side faces S.

The advantages of the present embodiment may be described as follows: If the scratches are generated at side faces S1, S2 sides of the dielectric layers 117, an insulation withstand voltage of the dielectric layers 117 may be decreased at the positions. By offsetting the internal electrodes 112, 113, predetermined areas at the side faces S1, S2 side of the dielectric layers 117 are not sandwiched by the internal electrodes 112, 113, whereby an insulation breakdown is less likely to occur. This also prevents the decrease in the product life or the withstand voltage of the multi-layer ceramic capacitor 10.

EXAMPLES

The embodiment of the present invent on will be described. The multi-layer ceramic capacitor 10 (hereinafter referred to as an "experimental chip") having the following configuration was produced by the above-described production method.

Configuration of Experimental Chip

Chip size (W×D×H): 1.0 mm×0.5 mm×0.5 mm (including external electrodes)

Thickness of dielectric layer: 0.7 μm

Number of dielectric layers: 315

Thickness of internal electrode layer: 0.7 μm

Number of internal electrode layers: 315

Thickness of cover layer: 35 μm

Thickness of side margin: 30 μm

Thickness of external electrode (including plating): 30 μm

Thickness of end margin: 50 μm

The thickness of the end margin is a minimum value of a distance between an edge of the internal electrode layer at an external electrode side where no internal electrode is drawn and the external electrode (for example, a distance between the internal electrodes 12 and the external electrode 15 in FIG. 2).

The offset sections of the experimental chip were provided by etching with concentrated nitric acid such that offset amounts (offset widths W in FIG. 4) of the internal electrodes from the side faces of the multi-layer before the side margins are retrofitted were set to different sizes, 0.5 μm, 1 μm and 10 μm. For comparison, an experimental chip corresponding to a multi-layer ceramic capacitor having no offset sections (the offset amounts of the internal electrodes are 0 μm) was produced by retrofitting the side margins after the side faces of the multi-layer are cut with no etching.

As described above, 100 experimental chips of the multi-layer ceramic capacitors having different offset amounts of the internal electrodes were produced to determine the number of short circuit occurrence between the internal electrodes. Table 1 shows the offset amounts and the number of short circuit occurrence in the experimental chip of the multi-layer ceramic capacitor according to the present embodiment.

TABLE 1

| Offset amount of electrode | Number of short circuit occurrence |
|---|---|
| 0 μm | 43/100 |
| 0.5 μm | 22/100 |
| 1 μm | 8/100 |
| 10 μm | 11/100 |

As shown in Table 1, the number of short circuit occurrence of the experimental chips having the offset sections where the offset amounts of the internal electrodes were 0.1 μm or more was lower than that of the experimental chips having no offset sections. From this result, it is conceivable that in the multi-layer ceramic capacitor having the offset sections, the internal electrodes are offset from the side faces of the multi-layer, whereby preventing the internal electrodes from conducting each other at the side faces and preventing the short circuit occurrence between the internal electrodes.

As other embodiment, an experimental chip was produced by etching with the laser radiation instead of using concentrated nitric acid, and was experimented similarly. As a result, the offset amount of the internal electrodes could be further reduced. Specifically, a short circuit occurrence rate was 0 in the experimental chip having the offset amount of 0.1 μm to 0.5 μm. The result reveals that the short circuit occurrence can be well inhibited between the internal electrodes even if the internal electrodes are offset by the laser irradiation and that t e number of short circuit occurrence can be decreased even if the offset amount is small. Consequently, the laser etching can provide the intersection areas between the internal electrodes with more certainly.

While the embodiment of the present invention has been described, the present invention is not limited only to the above-described embodiment, and it will be appreciated that various modifications and variations may be made.

For example, in the above-described embodiment, etching carried out with acid. However, it is not limited thereto, and ion bombardment may be usable. Alternatively, wet etching using an etchant other than acid, or dry etching may be applied.

The etching may be the laser irradiation using the laser.

Figure 11:
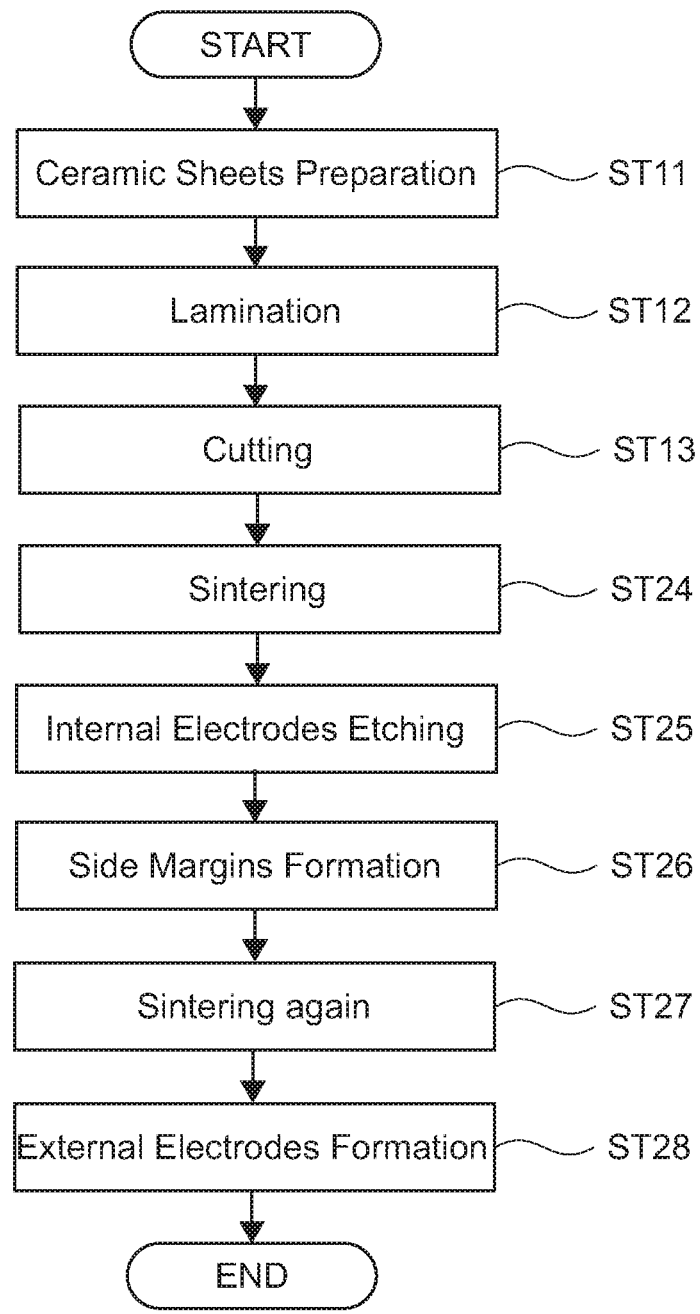
FIG. 11 is a flow chart showing a method of producing the mu ti-layer ceramic capacitor according other embodiment.

In the embodiment according to the method of producing the above-described multi-layer ceramic capacitor, etching for forming the offset sections and the formation of the side margins are carried out before the multi-layer chips (multilayers) are sintered. However, the timing of etching and the formation of the side margins are not limited thereto, and etching and the formation of the side margins may be carried out after the multi-layer chips are sintered. Specifically, as shown in FIG. 11, after the step of cutting the side faces of the unsintered multi-layer so as to expose the electrical conductors (Step ST13) among the above-described steps, the multi-layer chips are sintered to provide the multi-layer (Step ST24) and the internal electrodes exposed at the side faces of the multi-layer may be then etched (Step ST25). Thereafter, the unsintered side margins are retrofitted to the side faces of the etched multi-layer by the similar method as described above (Step ST26). The resultant capacitor body is sintered to form the side margins (Step ST27). Similar to the above, the external electrodes are formed (Step ST28). In this manner, by offsetting the ends of the internal electrodes from the side faces to the inward direction of the multi-layer during the manufacturing process of the multi-layer ceramic capacitor, the advantages as described above can be provided.

What is claimed is:

1. A multi-layer ceramic capacitor, comprising:
   a multi-layer where internal electrodes and dielectric layers are alternately laminated in a first direction;
   side margins comprising a ceramic material and disposed to cover side faces of the multi-layer from a second direction orthogonal to the first direction; and
   offset sections formed between the internal electrodes and the side margins such that ends at side faces of the internal electrodes are spaced apart from the side faces to an inward direction of the multi-layer and made with amorphous areas or gap areas, the amorphous areas constituted of a vitreous material, the gap areas made with air gaps, the offset sections respectively formed in the ends of all of the internal electrodes including an uppermost internal electrode and a lowermost internal electrode in a cross section viewed from a third direction orthogonal to the first direction and the second direction,
   wherein the amorphous areas or gap areas are in direct contact with the ends of all of the internal electrodes, respectively, and
   wherein the dielectric layers of the multi-layer are disposed between the offset sections adjacent to each other in the first direction.

2. The multi-layer ceramic capacitor according to claim 1, wherein
   a width of each offset section is 0.1 μm or more.

* * * * *